United States Patent
Van Woudenberg et al.

(10) Patent No.: US 6,724,707 B2
(45) Date of Patent: Apr. 20, 2004

(54) INFORMATION CARRIER AND DEVICES FOR SCANNING THE INFORMATION CARRIER

(75) Inventors: Roel Van Woudenberg, Eindhoven (NL); Aalbert Stek, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 301 days.

(21) Appl. No.: 09/854,392

(22) Filed: May 11, 2001

(65) Prior Publication Data

US 2002/0031067 A1 Mar. 14, 2002

(30) Foreign Application Priority Data

May 16, 2000 (EP) ................................ 00201728

(51) Int. Cl.$^7$ ................................ G11B 5/09
(52) U.S. Cl. ................ 369/59.24; 369/59.25; 369/275.3
(58) Field of Search ............... 369/44.26, 47.1, 369/47.21–47.31, 53.1–59.23, 275.1–279, 59.24, 59.25, 44.27, 44.28, 44.25

(56) References Cited

U.S. PATENT DOCUMENTS

| | | | | | |
|---|---|---|---|---|---|
| 5,587,975 | A | * | 12/1996 | Kobayashi | |
| 5,838,658 | A | * | 11/1998 | Nakane et al. | 369/275.3 |
| 5,933,410 | A | * | 8/1999 | Nakane et al. | 369/275.3 |
| 6,262,950 | B1 | * | 7/2001 | Narahara et al. | 369/59.23 |
| 6,345,023 | B1 | * | 2/2002 | Fushimi et al. | 369/47.48 |
| 6,452,897 | B1 | * | 9/2002 | Van Den Enden | 369/275.1 |
| 6,584,050 | B1 | * | 6/2003 | Okumura et al. | 369/47.5 |

FOREIGN PATENT DOCUMENTS

| | | | |
|---|---|---|---|
| EP | 0709842 A2 | 5/1996 | G11B/20/10 |
| WO | WO9750083 | 12/1997 | G11B/7/007 |

* cited by examiner

Primary Examiner—Doris H. To
Assistant Examiner—Jorge L Ortiz-Criado

(57) ABSTRACT

The invention relates to a predetermined synchronization pattern (40), a so-called VFO field, in, for example, the headers 3 of an information carrier. The proposed predetermined synchronization pattern (40) consists of sequences of 3T marks and spaces (41), of 8T marks and spaces (42) and of 5T marks and spaces (43). This sequence of patterns is advantageous for setting the dynamic range of an Automatic Gain Controlled (AGC) amplifier located within a device reading the information carrier.

2 Claims, 3 Drawing Sheets

INFORMATION CARRIER AND DEVICES FOR SCANNING THE INFORMATION CARRIER

FIELD OF INVENTION

Information carrier and devices for scanning the information carrier The invention relates to an information carrier comprising a recording area for writing patterns which represent user information and a header area comprising patterns which represent header information, said header area comprising a synchronization area comprising a predetermined synchronization pattern for synchronizing a clock frequency in a device in which the information carrier is used.

The invention also relates to reading device for reproducing information from such an information carrier and to a recording device for writing patterns which represent user information onto such an information carrier.

In the context of this application the term marks is to be understood to include all optically detectable regions on the information carrier such as, for example, amorphous regions within a crystalline surrounding on an information carrier of the phase change type or pits on an information carrier comprising embossed data, while the term spaces is to be understood to include all regions surrounding the marks. A pattern of marks and spaces represents the information on an information carrier.

BACKGROUND OF THE INVENTION

An information carrier according to the preamble is known from the European Computer Manufacturers Association Standard ECMA-154. Such an information carrier is also described in the Handbook of Magneto-Optical Data Recording; McDaniel, TW and Victora, RH; Noyes Publications; 1997. On the known information carrier information is recorded in tracks, a track being formed by a 360 degree turn of a continuous spiral. Each track is sub-divided into a number of segments, each segment starting with a header area. The user information is written in the segment areas between the header areas.

The header areas comprise patterns representing header information. This header information is used in a reading device and in a recording device to correctly assess or record information on the information carrier. The header area comprises, for example a pattern (i.e., the Address Mark) indicating that the patterns to follow represent the address of the segment. The header area also comprises a synchronization area, a so-called VFO field, for synchronizing a clock in the reading device and in the recording device in which the information carrier is used. Such a clock is, for example, generated by Variable Frequency Oscillator (VFO) circuitry located in the devices.

This VFO field is used to "lock up", i.e., establish the proper frequency and phase of the read/write channel clock in the devices when the header is read. More specifically, the VFO field establishes the write channel clock frequency and phase when a segment is being written and it establishes the read channel clock frequency and phase when a segment is being read. In general this "lock up" is realized by Phase Locked Loop (PLL) circuitry which relates the read/write channel clock to a signal obtained by reading the synchronization pattern in the VFO field.

The VFO field is also used to settle the slicer level of circuitry which converts an analog High Frequency (HF) signal, obtained by reading the patterns of marks and spaces representing the information, into a digital information signal. Furthermore, the VFO field is used to set the dynamic range of an Automatic Gain Controlled (AGC) amplifier which ensures that the full range of analog-to-digital conversion circuitry is utilized.

The segment areas between the header areas also comprise a VFO field. The user information is preceeded by a predetermined synchronization pattern, which pattern is used to settle the dynamic range of an Automatic Gain Controlled (AGC) amplifier, to settle the slicer level of circuitry which converts an analog High Frequency (HF) signal, obtained by reading the patterns of marks and spaces representing the information, into a digital information signal, and to settle the proper frequency and phase of the read/write channel clock in the devices when the predetermined synchronization pattern is read. These setting may deviate from those resulting from the reading of the predetermined synchronization pattern in the headers. This is due to the disc making process where header information and user information are not necessarily written with the same frequency and phase.

The VFO field consists of a predetermined synchronization pattern of marks and spaces. The predetermined synchronization pattern of the known information carrier consists of a sequence of 3T marks and 3T spaces, where T represents one channel bit length. This pattern results in a sequence of the shortest possible marks and spaces allowed by a (2, k) Run Length Limited (RLL) code used to convert the information into patterns representing the information on the information carrier, such as for example the EFMplus code used on DVD discs. Because of these short marks and spaces, a signal obtained by reading the VFO field contains a single high frequency which results in a fast "lock up" of the read/write channel clock, in the devices.

However, the predetermined synchronization pattern of the known information carrier has the problem that the setting of the Automatic Gain Controlled (AGC) amplifier is not optimal when a synchronization pattern consisting of sequences of 3T marks and 3T spaces is used.

SUMMARY OF THE INVENTION

It is inter alia an object of the invention to provide an information carrier which comprises a predetermined synchronization pattern which ensures an optimized setting of an Automatic Gain Controlled (AGC) amplifier in a device in which the information carrier is used.

This object is achieved by the information carrier according to the invention which is characterized in that the predetermined synchronization pattern comprises a first part and a second part, the second part being distinguishable from the first part.

When the known predetermined synchronization pattern consisting of sequences of 3T marks and 3T spaces is used, the dynamic range of the Automatic Gain Controlled (AGC) amplifier is set according to the dynamic range of the signal obtained by reading these, single frequency, patterns. The signal amplitude of these short marks is significantly lower than that of the longer marks. The signal amplitude when reading a sequence of these short marks can be as low as 20% of the amplitude when reading a sequence containing also long marks. However, the information on an information carrier consists of a mixture of marks and spaces having all lengths allowed by the applied RLL code. Therefore, the dynamic range of the Automatic Gain Controlled (AGC) amplifier is not set to an optimal value for reading all patterns on the information carrier.

To ensure an optimized setting of the dynamic range of the Automatic Gain Controlled (AGC) amplifier, the predetermined synchronization pattern according to the invention comprises two distinguishable parts; that is, a first part related to patterns resulting in a signal having a lower dynamic range and a second part relates to patterns resulting in a signal having a higher dynamic range. Because of this mixture, the dynamic range of the Automatic Gain Controlled (AGC) amplifier is set to an optimized value for reading all kinds of patterns on the information carrier, The first and the second part of the synchronization pattern are repeated sufficiently often to guarantee settling of the circuitry in the read/recording device (AGC, slicer level, frequency and phase) well before the actual data is read.

An embodiment of the information carrier according to the invention in which the predetermined synchronization pattern is composed of marks and of spaces between the marks, is characterized in that the first part of the predetermined synchronization pattern contains marks having a first length and spaces having a second length whereas the second part of the synchronization pattern contains marks having a third length and spaces having a fourth length, the first length being different from the third length and the second length being different from the fourth length.

A satisfactory setting of the dynamic range of the Automatic Gain Controlled (AGC) amplifier is obtained when the first part contains marks of a leng, also called run length, which differs from that of marks in the second part and when the first part contains spaces of a length, also called run length, which differs from that of spaces in the second part. An example in this respect involves a first part containing 3T marks and 3T spaces and a second part containing 8T marks and 8T spaces. However, non-symmetric parts may alternatively be used, for example a first part containing 3T marks and 8T spaces and a second part containing 8T marks and 3T spaces.

An additional advantage of this embodiment is that a correct "lock up" of the phase of the read/write channel clock is obtained even when the information carrier is placed in a reading device or in a recording device in a tilted position.

A further embodiment of the information carrier according to the invention is characterized in that the total length of all the marks in the predetermined synchronization pattern is substantially equal to the total length of all the spaces in the predetermined synchronization pattern.

Such a pattern, also referred to as a "DC-free" pattern, allows for an optimized setting of the slicer level of circuitry which converts an analog High Frequency (HF) signal, obtained by reading the patterns of marks and spaces representing the information, into a digital information signal.

An embodiment of the information carrier according to the invention in which the header information is converted into patterns in the header area according to a (d,k) Run Length Limited modulation code, in which d represents a predetermined natural number larger than 0 and k represents a predetermined natural number larger than d, and the length of each mark and each space is expressed as a number of channel bit lengths (T), is characterized in that the first part of the predetermined synchronization pattern contains marks having a first length of (d+l) times the channel bit length and spaces having a second length of (d+l) times the channel bit length, and the second part of the predetermined synchronization pattern contains marks having a third length of (k+l) times the channel bit length and spaces having a fourth length of (k+l) times the channel bit length.

When a (d,k) Run Length Limited modulation code is applied, the minimum length of a mark and of a space allowed is (d+l) times the channel bit length (i.e., (d+l)T). The maximum length of a mark and of a space allowed is (k+l) times the channel bit length (i.e., (k+l)T). When the predetermined synchronization pattern comprises a first part consisting of marks and spaces having a minimum length and a second part consisting of marks and spaces having a maximum length, the signal obtained by reading this predetermined synchronization pattern will comprise a part having the lowest signal amplitude and a part having the highest signal amplitude. Using such a signal, the dynamic range of the Automatic Gain Controlled (AGO) amplifier can be set such that satisfactory amplification is obtained for all signal amplitudes obtained by reading patterns having a length of between (d+l)T and (k+l)T.

A preferred embodiment of the information carrier according to the invention is characterized in that the predetermined synchronization pattern also comprises a third part, which third part contains marks having a length of (k−d) times the channel bit length and spaces having a length of (k−d) times the channel bit length.

When the header information is coded according to (2,7) RLL coding, a predetermined synchronization pattern (i.e. a VFO pattern) comprising 3T marks and spaces, 5T marks and spaces, and 8T marks and spaces will yield in a good "lockup" of the read/write channel clock and a good setting of the slicer level. Such a (2,7)RLL coding, is for example, used in the embossed data areas on an information carrier as used in a Digital Video Recording system described in Optical Disc System for Digital Video Recording; Jpn. J. Appl. Phys.; Vol. 39, part 1; February 2000.

A particularly advantageous predetermined synchronization pattern comprises sequences of "3T mark–3T space–8T mark–8T space–5T mark–5T space".

Although good results are obtained by applying symmetric parts, i.e. parts in which the length of a mark is substantially equal to the length of a space, alternative sequences, such as for example "3T mark–8T space–5T mark–3T space–8T mark–5T space", can also be used.

It is to be noted that when a (d,k) Run Length Limited modulation code is applied with large values of the constant k, it is less essential that the maximum allowed length of (k+l)T is used for the marks and spaces in the predetermined synchronization pattern. It also suffices to use marks and spaces of such a length that the amplitude of the signal obtained by reading the pattern is substantially equal to that obtained when reading the longest allowed marks and spaces. For example, the same "3T–3T–8T–8T–5T–5T" sequence used for the (2,7)RLL code can also be used for a (2,10) RLL code such as an EFMplus code used in DVD systems. The signal amplitude obtained by reading an 11T mark is only marginally higher than that obtained when reading an 8T mark.

Since the time that a clock retrieval circuit (such as, for example, a Phase Locked Loop circuit) needs to lock up the frequency and the phase of the channel clock is approximately inversely proportional to the number of transitions in the predetermined synchronization pattern, a trade-off between a perfect setting of the dynamic range of the Automatic Gain Controlled (AGC) amplifier and the lock up speed of the Phase Locked Loop circuit could result in an 8T mark being used instead of an 11T mark.

The object is also achieved by providing an information carrier comprising a recording area for writing patterns which represent user information and header areas comprising patterns which represent header information, said recording area comprising synchronization areas which comprise a predetermined synchronization pattern for synchronizing a clock frequency in a device in which the information carrier is used, the user information being converted into patterns in the recording area according to a (1,7) Run Length Limited modulation code, the predetermined synchronization pattern being composed of marks and of spaces between the marks and the length of each mark and each space being expressed as a number of channel bit lengths (T), characterized in that the predetermined synchronization pattern comprises a first part containing marks having a length of 2 times the channel bit length and spaces having a length of 2 times the channel bit length, and also comprises a second part containing marks having a length of 5 times the channel bit length and spaces having a length of 5 times the channel bit length, and also comprises a third part containing marks having a length of 3 times the channel bit length and spaces having a length of 3 times the channel bit length.

When the header information is coded according to (1,7) RLL coding, a predetermined synchronization pattern comprising 2T marks and spaces, 3T marks and spaces, and 5T marks and spaces will result in an attractive setting of an Automatic Gain Controlled (AGC) amplifier in a device in which the information carrier is used. An example of such a (1,7)RLL coding is the 17 PP coding used for coding user information in a Digital Video Recording system as described in Optical Disc System for Digital Video Recording; Jpn. J. Appl. Phys.; Vol. 39, part 1; February 2000. A particularly advantageous predetermined synchronization pattern comprises sequences of "3T mark–3T space–2T mark–2T space–5T mark–5T space". In this embodiment of the invention it is sufficient to use 5T marks and 5T spaces because the amplitude of the signal obtained by reading these 5T marks and 5T spaces is substantially equal to that obtained when reading the longest allowed marks and spaces (i.e. 8T marks and spaces).

Although favorable results are obtained by applying symmetric parts, i.e. parts in which the length of a mark is substantially equal to the length of a space, alternative sequences such as, for example "2T mark–5T space–3T mark–2T space–5T mark–3T space", can also be used.

It will be apparent to a person skilled in the art that the proposed predetermined synchronization patterns for use in a VFO field can also be used advantageously as guard patterns and as dummy data patterns. Guard patterns are patterns used to overwrite patterns to be erased. Guard patterns are also written at locations where the electronics of a reading device, when reading the information carrier, need to run undisturbed, for example, at linking positions. Dummy data patterns may be written to any region on the information carrier, which region is not allowed to be empty (i.e. not comprise any marks).

It is a further object of the invention to provide a reading device for reproducing information from an information carrier according to the invention and to provide a recording device for writing patterns which represent user information onto an information carrier according to the invention.

BRIEF DESCRIPTION OF THE DRAWINGS

These and other objects, features and advantages of the invention will be apparent from the following, more specific description of embodiments of the invention as illustrated in the accompanying drawings, where.

DETAILED DESCRIPTION OF THE INVENTION

Figure 1:
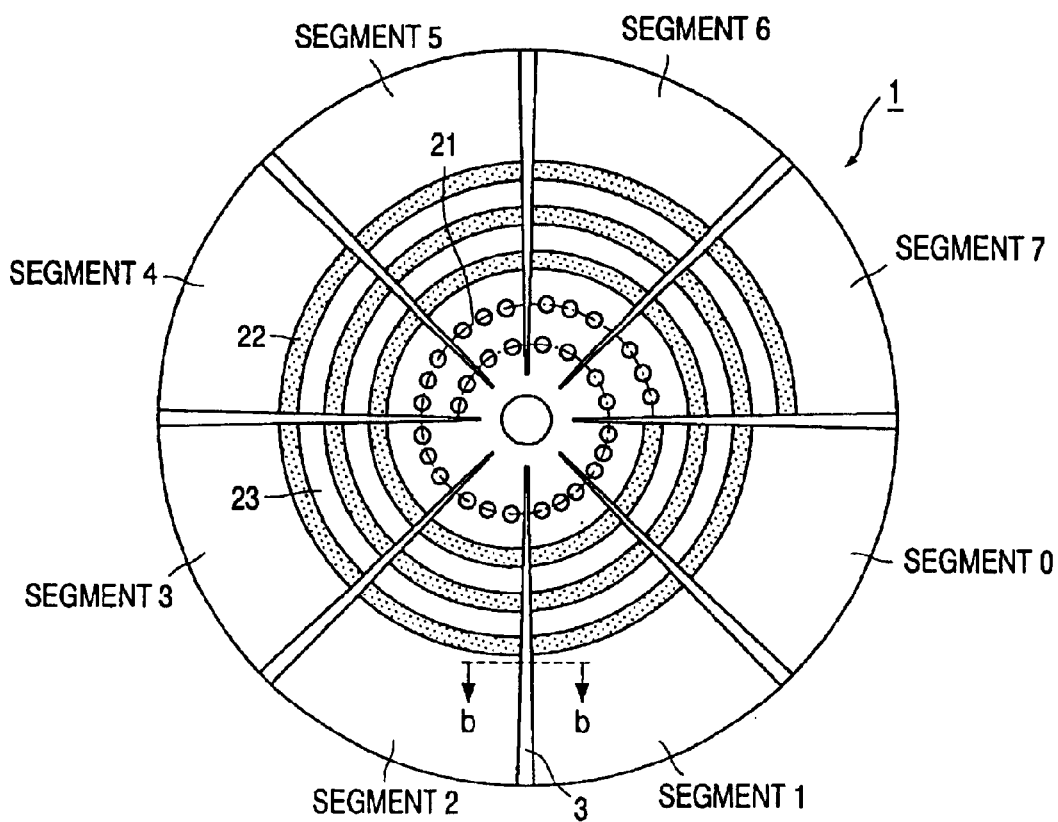
FIG. 1 shows an embodiment of an information carrier according to the invention, FIG. 2 diagrammatically shows a header area.

FIG. 1 shows a disc-shaped information carrier 1 of an optically readable type. At the inner radius of the information carrier 1 tracks 21 are formed by a series of embossed pits in a single spiral. These embossed tracks comprise prerecorded information. At the outer radius of the information carrier 1 the tracks are formed by a single spiral groove, the Groove track 22, extending from the inside of the information carrier towards the outside of the information carrier and by a single spiral, the Land track 23, in between neighboring grooves. User information may be recorded in both the Groove tracks 22 and the Land tracks 23. Each track is divided into 8 segments numbered segment 0 to segment 7. Each segment starts with a header area 3 comprising patterns of embossed pits and of spaces between the pits which represent header information.

Figure 2:
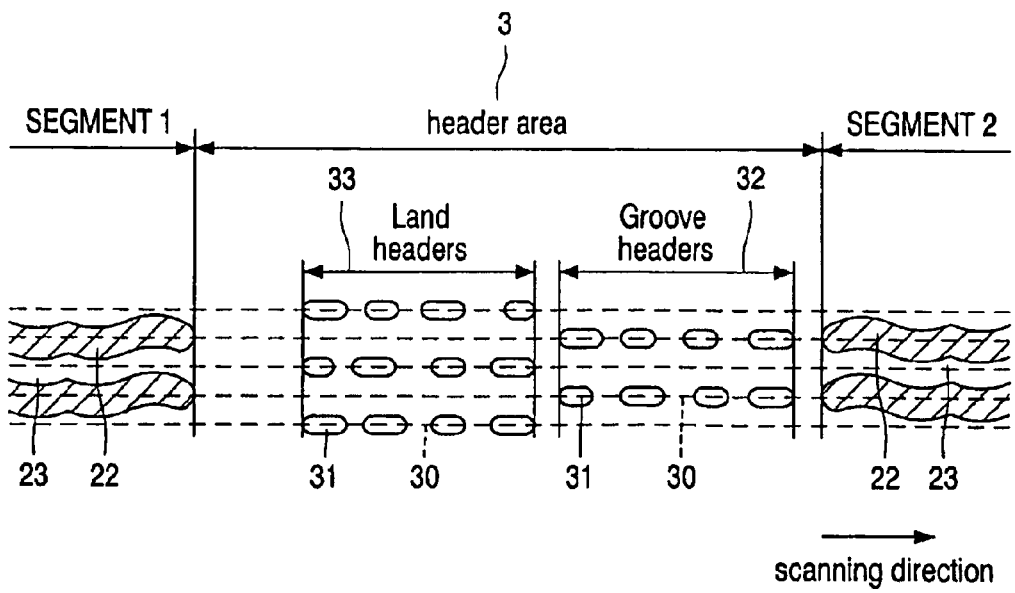

FIG. 2 shows a section along the line b—b of the information carrier 1. A header area 3 is located in between segment 1 and segment 2 of the recording area. Segemnt 1 and segment 2 each comprise Groove tracks 22 and Land tracks 23. The header area 3 comprises Groove headers 32 related to the Groove tracks 22 and Land headers 33 related to the Land tracks 23. During reading of the information carrier 1, the Land headers 33 appear at an earlier moment in time than the Groove headers 32. The Groove headers 32 and the Land headers 33 comprise header information which is represented by a patterns of marks 31 in the form of embossed pits and of spaces 20 between the marks.

Figure 3A:
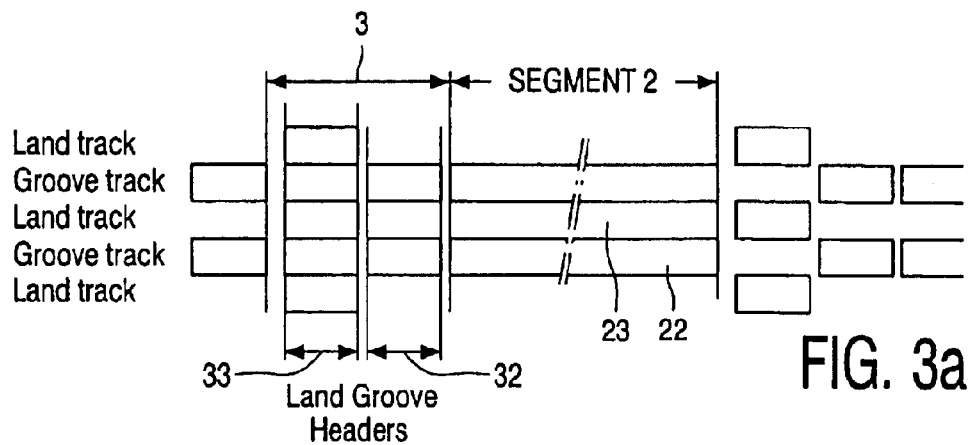
FIG. 3 shows a lay-out of a header area.
Figure 3B:
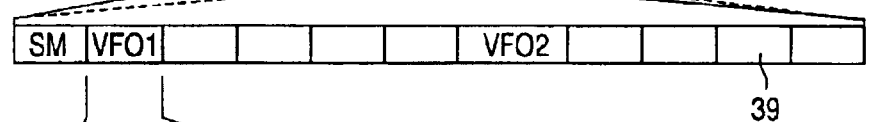

FIG. 3b shows a lay-out of a Groove header 32 or a Land header 33 within the header area 3. Each header consists of a number of fields 39. A Sector Mark field, SM, is generally located at the beginning of a header. This SM field contains a unique pattern, allowing it to be easily found so that it unambiguously indicates the beginning of a segment.

The header also comprises at least one VFO field, VFO1. The header may also comprise further VFO fields, such as for example VFO field VFO2. The VFO fields are used to "lock up", i.e. establish the proper frequency and phase of the read/write channel clock of the devices when the header is read. The VFO fields are also used to settle the slicer level of circuitry which converts an analog High Frequency (HF) signal, obtained from reading the patterns of marks and spaces representing the information, into a digital information signal. Furthermore, the VFO fields are used to set the dynamic range of an Automatic Gain Controlled (AGC) amplifier which ensures that the full range of an analog-to-digital conversion circuit is utilized.

Figure 3C:
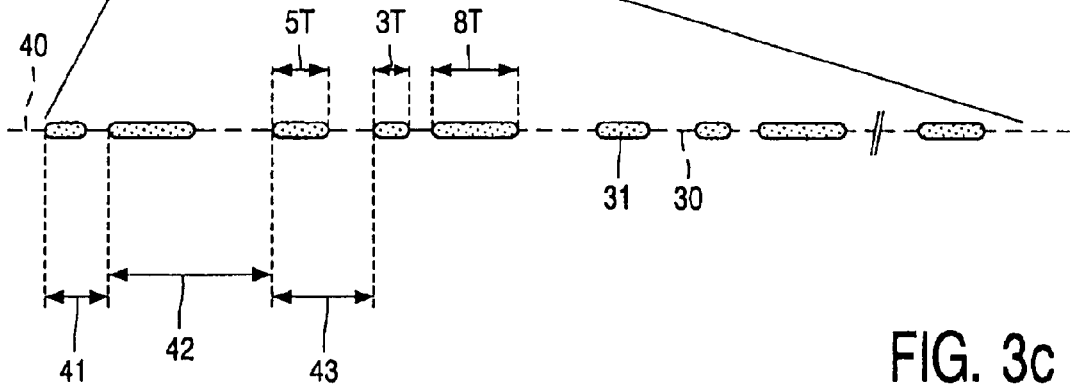

A VFO field consists of a predetermined synchronization pattern of marks 31 and spaces 30. FIG. 3c shows a particularly attractive predetermined synchronization pattern 40. This pattern 40 consists of sequences of a first part 41, containing a 3T mark and a 3T space, of a second part 42, containing an 8T mark and an 8T space, and of a third part 43, containing a 5T mark and a 5T space. T represents one channel bit length. The total length of a sequence is, for example, 288 channel bit lengths.

The predetermined synchronization pattern 40 is particularly advantageous when the header information is converted into patterns in the header area 3 according to a (2,7) Run Length Limited modulation code. The shortest length of the marks and of the spaces allowed by this modulation code is 3T, while the longest length of the marks and of the spaces allowed by this modulation code is 8T. Because both the shortest and the longest allowed lengths of the marks and of the spaces are incorporated in the predetermined synchronization pattern 40, a signal obtained by reading this predetermined synchronization pattern 40 will have a maximum dynamic range of the amplitude. A good setting of the dynamic range of an Automatic Gain Controlled (AGC) amplifier can be obtained from such a signal.

Figure 4:
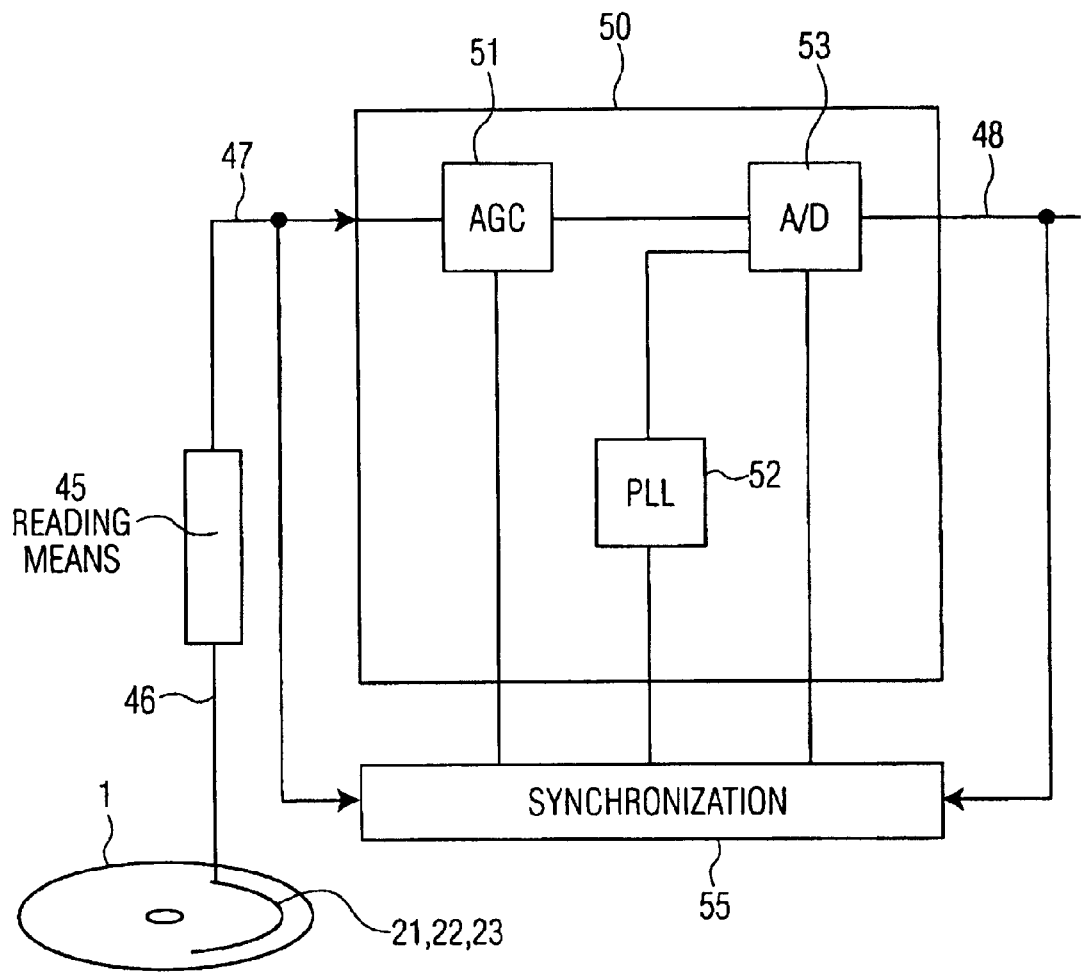
FIG. 4 shows an embodiment of a reading device according to the invention.

FIG. 4 shows a reading device according to the invention for reading the disc-shaped information carrier 1. The reading device comprises reading means 45 for reading information, such as the predetermined synchronization pattern 40, from the information carrier 1. The reading means 45 scan the tracks 21, 22 and 23 by way of a radiation beam 46. The information carrier 1 rotates, driven by driving means, while the reading means 45 read the tracks 21, 22 and 23 by way of the beam 30 and convert the optically readable marks representing the information into an electric analog High Frequency signal 47. The reading device also includes demodulation means 50 for recovering a digital information signal 48 from the electric analog High Frequency signal 47.

The demodulation means include an Automatic Gain Controlled (AGC) amplifier 51 for amplifying the electric analog High Frequency signal 47, a Phase Locked Loop 52 for generating a clock signal and circuitry 53 which converts the amplified analog High Frequency signal 47 into the digital information signal 48.

The settings of the Automatic Gain Controlled (AGC) amplifier 51, the Phase Locked Loop 52 and the circuitry 53 are controlled by synchronization means 55. These synchronization means 55 determine the correct setting for the dynamic range of the Automatic Gain Controlled (AGC) amplifier 51, for the frequency and the phase of the clock signal generated by the Phase Locked Loop 52 and for the slicer level of the circuitry 53. Such correct settings are determined by the synchronization means 55 inter alia from a part of the electric analog High Frequency signal 47 corresponding to the READ predetermined synchronization pattern 40 in the VFO field of the information carrier 1.

What is claimed is:

1. An information carrier comprising a recording area for writing patterns which represent user information and header areas comprising patterns which represent header information, said recording area comprising synchronization areas which comprise a predetermined synchronization pattern for synchronizing a clock frequency in a device in which the information carrier is used, the user information being converted into patterns in de recording area according to a (1,7) Run Length Limited modulation code, the predetermined synchronization pattern being composed of marks and of spaces between the marks and the length of each mark and each space being expressed as a number of channel bit lengths (T), characterized in that the predetermined synchronization pattern comprises a first part containing marks having a length of 2 times the channel bit length and spaces having a length of 2 times the channel bit length, and also comprises a second part containing marks having a length of 5 times the channel bit length and spaces having a length of 5 times the channel bit length, and also comprises a third part containing marks having a length of 3 times the channel bit length and spaces having a length of 3 times the channel bit length.

2. A recording method for writing information patterns which represent user information onto a recording area of an information carrier, comprising the steps of:

providing a predetermined synchronization pattern for synchronizing a clock frequency in a device in which the information carrier is used, composing said predetermined synchronization pattern with marks and of spaces between the marks, the length of each mark and each space being expressed as a number of channel bit lengths (T) and the user information being converted into information patterns according to a (1,7) Run Length Limited modulation code, characterized In that the predetermined synchronization pattern comprises a first part containing marks having a length of 2 times the channel bit length and spaces having a length of 2 times the channel bit length, and also comprises a second part containing marks having a length of 5 times the channel bit length and spaces having a length of 5 times the channel bit length, and also comprises a third part containing marks having a length of 3 times the channel bit length and spaces having a length of 3 times the channel bit length.

* * * * *